United States Patent
Glugla et al.

(10) Patent No.: US 10,704,525 B2
(45) Date of Patent: Jul. 7, 2020

(54) METHOD AND SYSTEM FOR SPARK PLUG CLEANING

(71) Applicant: Ford Global Technologies, LLC, Dearborn, MI (US)

(72) Inventors: Chris Paul Glugla, Macomb, MI (US); Nelson William Morrow, Jr., Saline, MI (US); Michael Damian Czekala, Canton, MI (US); Garlan J. Huberts, Milford, MI (US); Robert Sarow Baskins, Grass Lake, MI (US); Russell Senior, Linden, MI (US); Rodney Schook, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 360 days.

(21) Appl. No.: 15/340,190

(22) Filed: Nov. 1, 2016

(65) Prior Publication Data

US 2018/0119665 A1    May 3, 2018

(51) Int. Cl.
*F02P 9/00* (2006.01)
*F02D 13/02* (2006.01)
(Continued)

(52) U.S. Cl.
CPC ............ *F02P 9/00* (2013.01); *F02D 13/0219* (2013.01); *F02D 19/085* (2013.01); (Continued)

(58) Field of Classification Search
CPC .... F02P 9/00; F02N 11/0814; F02D 13/0219; F02D 19/085; F02D 41/042; F02D 2041/001; Y02T 10/18
See application file for complete search history.

(56) References Cited

U.S. PATENT DOCUMENTS 4,366,780 A * 1/1983 Anderton ................. F01M 3/04
                                                    123/1 A
5,142,479 A * 8/1992 Poirier ................. F02D 41/064
                                                   123/179.16
(Continued)

FOREIGN PATENT DOCUMENTS

EP          0873469 B1    7/1997
JP       2008215298 A     9/2008

OTHER PUBLICATIONS

Glugla, Chris Paul, et al., "Method and System for Detection of Hot Spark Plug Fouling," U.S. Appl. No. 14/755,980, filed Jun. 30, 2015, 39 pages.

(Continued)

*Primary Examiner* — David Hamaoui
(74) *Attorney, Agent, or Firm* — Geoffrey Brumbaugh; McCoy Russell LLP (57) ABSTRACT

Methods and systems are provided for controlling spark plug fouling in newly manufactured vehicles. In one example, an engine is operated with a first, more aggressive spark discharge schedule when in a pre-delivery state and transitioned to a second, less aggressive spark discharge schedule when in a post-delivery state. In each spark discharge schedule, a spark plug ignition coil is repeatedly discharged when the engine is off, such as when the engine is spinning down to rest on a shutdown event or before the engine is fueled on an engine restart event.

6 Claims, 6 Drawing Sheets

| Pre-delivery (green) state | | Post-delivery (non-green) state | |
|---|---|---|---|
| Spark schedule A | Spark schedule B | Spark schedule C | Spark schedule D |
| The engine may be operated according to a first spark schedule responsive to the inferred soot load being higher than a first threshold. | Enabled before an indication of spark plug fouling is received so as to pre-empt spark plug fouling. Therein, a spark plug ignition coil may be discharged a plurality of times during engine spin-down and while the engine is at rest in order to raise spark plug tip temperatures, and burn away any accumulated soot. In addition, the spark plug ignition coil may be discharged before the engine is started and before the vehicle is driven. | The engine may be operated according to a second, different spark schedule responsive to the inferred soot load being higher than a second threshold. | Responsive to an indication of spark plug fouling at the non-green engine. Therein, the spark plug ignition coil may be discharged a plurality of times during engine spin-down and at rest, as well as before an engine start preceding a vehicle launch. |

(51) Int. Cl.
  F02D 19/08 (2006.01)
  F02N 11/08 (2006.01)
  *F02D 41/04* (2006.01)
  *F02D 41/00* (2006.01)

(52) U.S. Cl.
  CPC ........ *F02N 11/0814* (2013.01); *F02D 41/042* (2013.01); *F02D 2041/001* (2013.01); *Y02T 10/18* (2013.01)

(56) References Cited

U.S. PATENT DOCUMENTS

| | | | |
|---|---|---|---|
| 5,274,298 A * | 12/1993 | Cassidy | H01T 13/38 |
| | | | 123/169 CL |
| 5,617,829 A | 4/1997 | Bidner et al. | |
| 5,752,488 A * | 5/1998 | Hattori | F02D 41/061 |
| | | | 123/179.16 |
| 6,225,752 B1 * | 5/2001 | Matsubara | H01T 13/38 |
| | | | 123/169 EL |
| 6,425,365 B1 * | 7/2002 | Peters | B60K 6/442 |
| | | | 123/198 DB |
| 6,736,108 B2 | 5/2004 | Rayl et al. | |
| 6,769,403 B2 | 8/2004 | Rayl et al. | |
| 7,255,080 B1 | 8/2007 | Leone | |
| 7,779,813 B2 * | 8/2010 | Hahn | F02D 35/021 |
| | | | 123/305 |
| 7,886,729 B2 | 2/2011 | Russell et al. | |
| 8,050,844 B2 * | 11/2011 | Hoard | F02D 41/405 |
| | | | 123/299 |
| 8,132,556 B2 * | 3/2012 | Glugla | F02D 35/021 |
| | | | 123/406.11 |
| 8,150,604 B2 * | 4/2012 | Ma | F02D 37/02 |
| | | | 701/111 |
| 8,176,888 B2 * | 5/2012 | Reiche | F02D 41/0025 |
| | | | 123/179.7 |
| 8,397,695 B2 | 3/2013 | Glugla et al. | |
| 9,404,468 B2 | 8/2016 | Glugla et al. | |
| 9,541,014 B2 * | 1/2017 | Glugla | F02D 31/006 |
| 9,683,535 B2 * | 6/2017 | Glugla | F02P 17/12 |
| 9,719,436 B2 * | 8/2017 | Glugla | F02D 13/06 |
| 9,790,874 B2 * | 10/2017 | Dudar | F02D 41/0035 |
| 9,909,523 B1 * | 3/2018 | Glugla | F02B 17/005 |
| 9,945,344 B2 * | 4/2018 | Glugla | F02D 41/005 |
| 2011/0226215 A1 | 9/2011 | Pursifull et al. | |
| 2012/0216784 A1 * | 8/2012 | Utley | F02D 41/064 |
| | | | 123/557 |
| 2014/0316673 A1 * | 10/2014 | Glugla | F02P 3/051 |
| | | | 701/102 |
| 2014/0343827 A1 | 11/2014 | Glugla et al. | |
| 2015/0047607 A1 | 2/2015 | Glugla et al. | |
| 2015/0176508 A1 | 6/2015 | Glugla et al. | |
| 2015/0176558 A1 | 6/2015 | Glugla et al. | |
| 2015/0300312 A1 | 10/2015 | Ferguson et al. | |
| 2016/0146126 A1 | 5/2016 | Glugla | |
| 2016/0146127 A1 | 5/2016 | Glugla | |
| 2018/0094597 A1 * | 4/2018 | Guo | F02D 41/064 |

OTHER PUBLICATIONS

Glugla, Chris Paul, et al., "Method and System for Ignition Control," U.S. Appl. No. 14/814,289, filed Jul. 30, 2015, 49 pages.
Glugla, Chris Paul, et al., "Method and System for Ignition Control," U.S. Appl. No. 14/814,764, filed Jul. 31, 2015, 38 pages.
Glugla, Chris Paul, et al., "Method and System for Engine Control," U.S. Appl. No. 15/181,198, filed Jun. 13, 2016, 54 pages.
Glugla, Chris Paul, et al, "Methods and Systems for Engine Fueling," U.S. Appl. No. 15/286,355, filed Oct. 5, 2016, 52 pages.

* cited by examiner

| Engine Condition | Action for addressing spark plug fouling | |
|---|---|---|
| | Alternative camshaft timing | Alternative spark timing |
| Pre-delivery (Green condition) | Configure for late exhaust valve opening | Operate two groups of cylinders at different spark timings: one advanced and one at or retarded from MBT |
| Post-delivery (Non-green condition) | Alternative camshaft timing expires after a threshold number of starts or threshold mileage | Alternative calibration turned off post-delivery or performed to a lesser degree if NVH criteria met |

| Pre-delivery (green) state | | Post-delivery (non-green) state | |
|---|---|---|---|
| Spark schedule A | Spark schedule B | Spark schedule C | Spark schedule D |
| The engine may be operated according to a first spark schedule responsive to the inferred soot load being higher than a first threshold. | Enabled before an indication of spark plug fouling is received so as to pre-empt spark plug fouling. Therein, a spark plug ignition coil may be discharged a plurality of times during engine spin-down and while the engine is at rest in order to raise spark plug tip temperatures, and burn away any accumulated soot. In addition, the spark plug ignition coil may be discharged before the engine is started and before the vehicle is driven. | The engine may be operated according to a second, different spark schedule responsive to the inferred soot load being higher than a second threshold. | Responsive to an indication of spark plug fouling at the non-green engine. Therein, the spark plug ignition coil may be discharged a plurality of times during engine spin-down and at rest, as well as before an engine start preceding a vehicle launch. |

FIG. 6

METHOD AND SYSTEM FOR SPARK PLUG CLEANING

FIELD

The present description relates generally to methods and systems for controlling a vehicle engine to address spark plug fouling.

BACKGROUND/SUMMARY

Engine ignition systems may include a spark plug for delivering an electric current to a combustion chamber of a spark-ignited engine to ignite an air-fuel mixture and initiate combustion. Based on engine operating conditions, spark plug fouling can occur wherein a firing tip of the spark plug insulator becomes coated with a foreign substance, such as fuel, oil, or soot. For example, vehicles may be moved over short distances multiple times, such as to various temporary storage locations in an assembly plant during vehicle assembly, with the engine running for short periods of time. These short engine cycles can lead to carbon and other deposits forming on the spark plugs, resulting in spark plug fouling and undesirable engine performance. The problem may be exacerbated in engines running with direct fuel injection due to increased spray impingement of fuel on the spark plug from the direct fuel injector.

Once fouled, the spark plug may be unable to provide adequate voltage to trigger cylinder combustion until the spark plug is sufficiently cleaned or replaced. The spark plug may be cleaned by burning off the soot accumulated on the fouled spark plug by operating the engine in speed-load conditions that sufficiently raise the spark plug tip temperature. However, the short vehicle trips at the assembly plant do not allow for adequate heat transfer to burn off the soot.

Various strategies have been developed to address spark plug fouling associated with short run times at the assembly plant. One example approach shown by Glugla et al. in U.S. Pat. No. 8,397,695 employs an alternate engine calibration with progressively more aggressive control procedures to develop more heat in the combustion chambers and eliminate any spark plug deposits. The control procedures may include repetitive sparking, exhaust stroke sparking, increased engine loading, advanced spark timing, lean air/fuel ratio, and elevated engine idle speed. Still other approaches for reducing fouling including disabling exhaust gas recirculation and limiting an engine power output.

However, the inventors herein have identified potential issues with such approaches. As an example, the alternate calibration may be employed only for a limited number of engine starts and/or may expire after a defined mileage is driven in a given trip. Alternatively, the calibration may be disabled before the vehicle is delivered to a customer. Thereafter, the engine controller may resume a default production calibration, and the alternate calibration may not be accessed again. However, the spark plugs may remain fouled even after the alternate calibration is in effect, degrading engine performance after vehicle delivery. Furthermore, the lean air/fuel ratio of the alternate calibration may result in engine stalling, particularly during cold starts, and the higher engine idle speed may be objectionable to some customers. As another example, some customers may operate the vehicle under similar conditions with short drive cycles that facilitate spark plug deposit formation. In such cases, the spark plugs may continue to be prone to spark plug fouling. The elevated propensity for spark plug fouling can result in low mile warranty issues.

In one example, the issues described above may be addressed by a method for an engine comprising: responsive to an engine shutdown request, after disabling cylinder fueling, intermittently discharging an ignition coil of a spark plug, discharge parameters of the discharging based on a soot load of the spark plug. In this way, spark plug fouling can be addressed more effectively.

Figure 6:
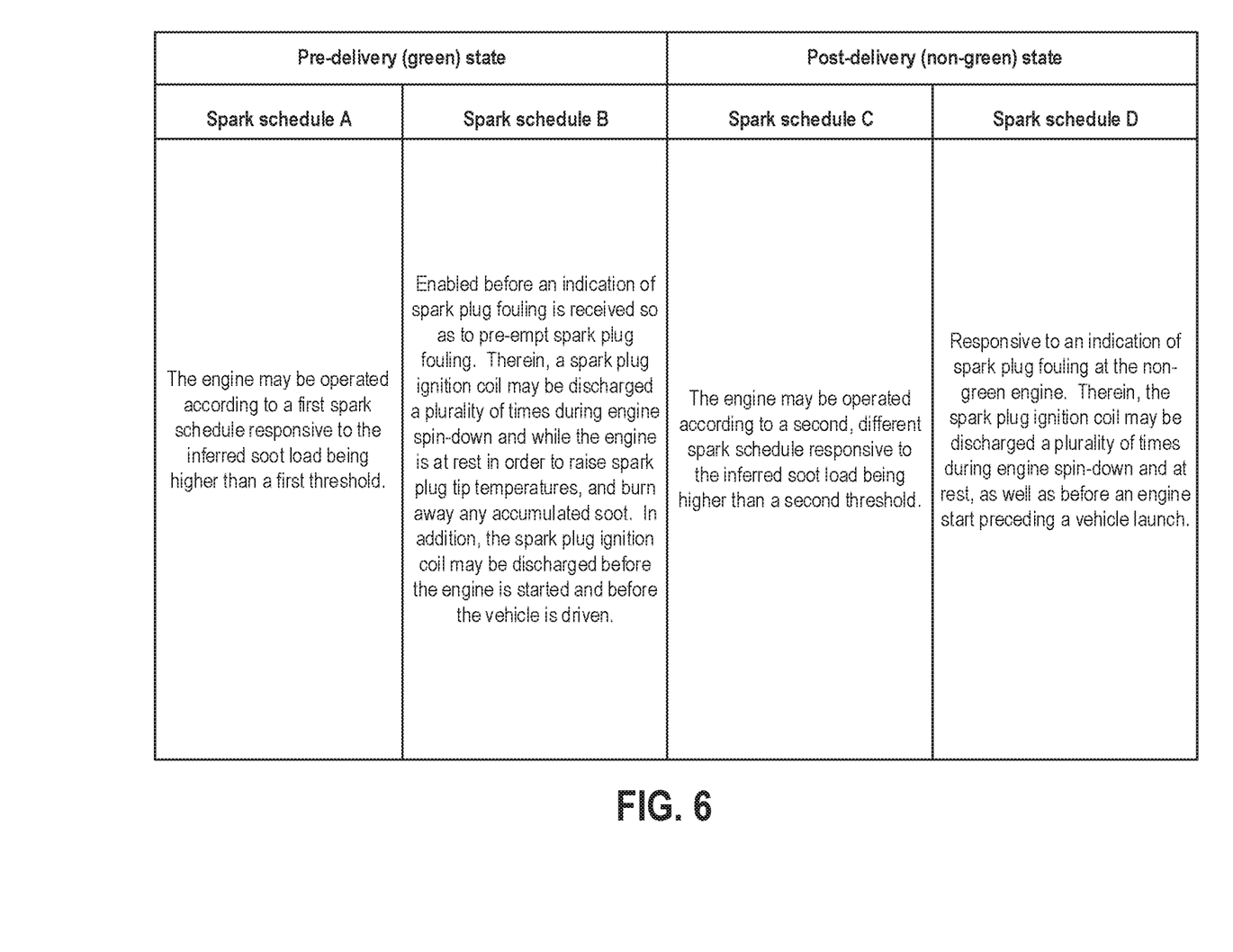
FIG. 6 shows a table comparing spark schedules that may be used for addressing spark plug fouling in pre-delivery and post-delivery states.

As one example, while a vehicle is being assembled and/or operated at an assembly plant, the engine may be operated with a first adjusted ignition coil discharge schedule (see FIG. 6, schedule B). The first discharge schedule may be enabled responsive to the vehicle being at the assembly plant and the engine being in a green engine condition. Furthermore, the first discharge schedule may be enabled before an indication of spark plug fouling is received so as to pre-empt spark plug fouling. Therein, a spark plug ignition coil may be discharged a plurality of times during engine spin-down and while the engine is at rest in order to raise spark plug tip temperatures, and burn away any accumulated soot. In addition, the spark plug ignition coil may be discharged before the engine is started and before the vehicle is driven. A discharging frequency as well as a discharge time on each discharge event may be adjusted to be higher in the first schedule, the discharge parameters based on the soot load (actual or expected) of the spark plug during the green engine condition. The opportunistic discharging enables spark plug fouling issues in a green engine (where the vehicle is still at the assembly plant) to be reduced. In comparison, when the vehicle is operated after leaving the assembly plant, the engine may be recalibrated to be operated with a second, different ignition coil discharge schedule (see FIG. 6, schedule D). The second schedule may be selectively enabled responsive to an indication of spark plug fouling at the non-green engine. Therein, the spark plug ignition coil may be discharged a plurality of times during engine spin-down and at rest, as well as before an engine start preceding a vehicle launch. The second schedule may include a lower duty cycle and a shorter discharge time as compared to the first schedule, the discharge parameters based on the soot load (actual or expected) of the spark plug during the non-green engine conditions. Once it is determined that the spark plug is sufficiently clean, or sufficiently warm, ignition coil discharge during engine spin-down and before engine restart may be disabled.

In this way, spark plug fouling issues can be reduced. The technical effect of frequently discharging the ignition coil during engine spin-down and after the engine is at rest is that spark plug tip temperatures may be raised to, and held at, higher temperatures for a longer duration, improving spark plug health. Further, spark plug cleaning can be performed without compromising emission standards, fuel economy, and engine performance benefits. By better addressing spark plug fouling in a green engine, low mile warranty issues are reduced. By improving spark plug health, cylinder misfire events can be reduced and, engine component life may be extended.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
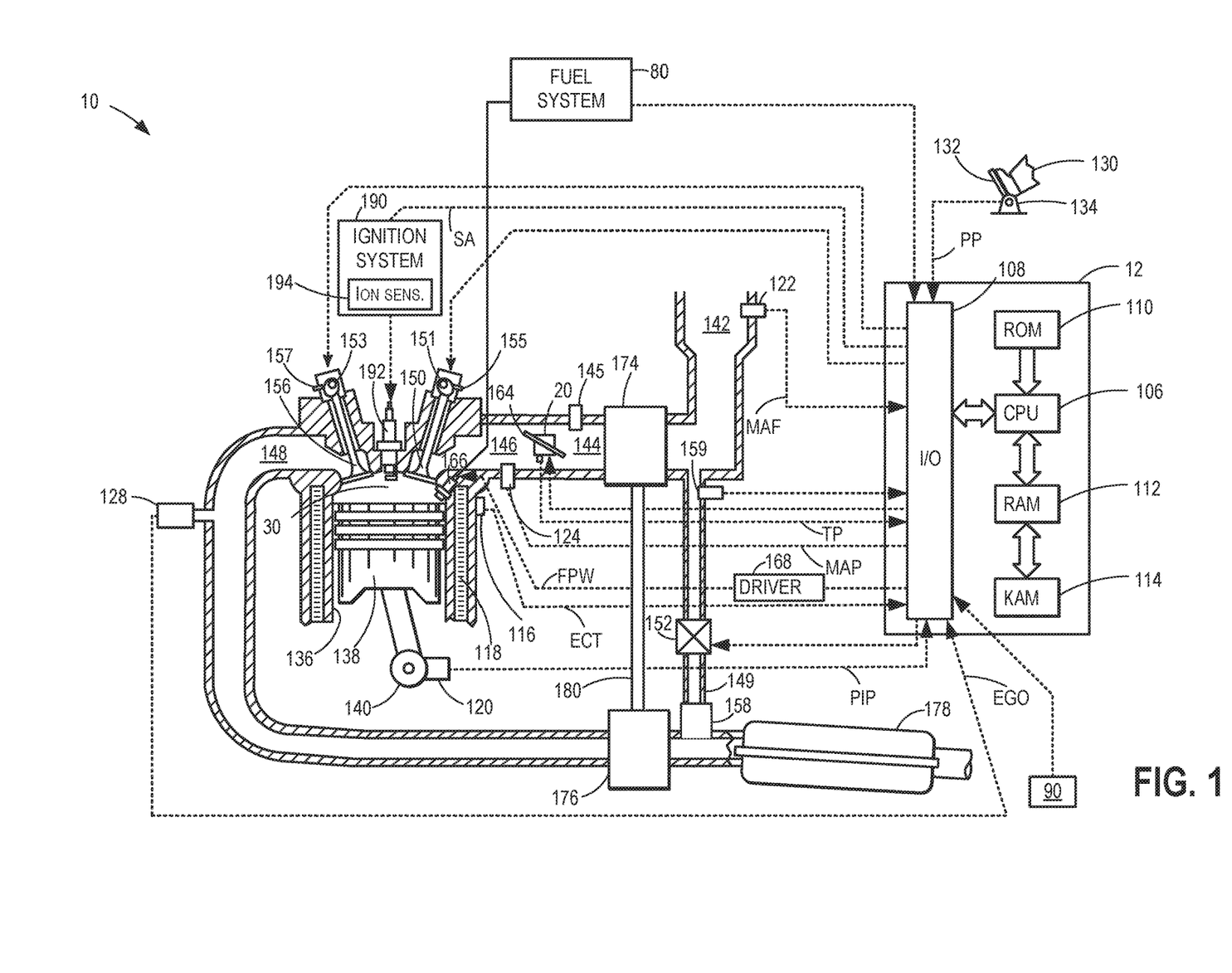
FIG. 1 shows a schematic diagram of an internal combustion engine.

The following description relates to systems and methods for better addressing spark plug fouling in an engine system, such as the engine system of FIG. 1. An engine controller may be configured to perform a control routine, such as the routine of FIG. 2, to burn off accumulated soot on a spark plug by discharging a spark ignition coil during engine spin-down or when the engine is at rest so as to raise the spark plug tip temperature. As elaborated at FIG. 3, the controller may operate the engine with a first discharge schedule when the engine is in a green engine state and the vehicle has not yet left an assembly plant to pre-empt spark plug soot accumulation or fouling. The controller may operate the engine with a second, different discharge schedule in response to an indication of spark plug fouling when the engine is in a non-green state and the vehicle has left the assembly plant. The spark discharge schedules may be used in addition to one or more soot burning methods including spark timing and cam timing adjustments, as described with reference to FIG. 4. Example spark schedules are summarized in FIG. 6. Example spark plug discharge schedules used in a green engine and a non-green engine are shown with reference to FIG. 5.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Combustion chamber (i.e., cylinder) 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of a vehicle via an intermediate transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 1 shows engine 10 configured with a turbocharger including a compressor 174 arranged between intake passages 142 and 144 and an exhaust turbine 176 arranged along exhaust passage 148. Compressor 174 may be at least partially powered by exhaust turbine 176 via a shaft 180, where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20, including a throttle plate 164, may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 30. In one example, exhaust passage 148 may receive exhaust from all of the cylinders of engine 10. However, in some embodiments, the exhaust from one or more cylinders may be routed to a first exhaust passage, while the exhaust from one or more other (remaining) cylinders may be routed to a second, different exhaust passage, the distinct exhaust passages then converging further downstream at or beyond an exhaust emission control device. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

Engine 10 may further include an exhaust gas recirculation (EGR) system to route a portion of exhaust gas from exhaust passage 148 to intake manifold 144. FIG. 1 shows a low pressure EGR (LP-EGR) system, but an alternative embodiment may include only a high pressure EGR (HP-EGR) system or a combination of both LP-EGR and HP-EGR systems. The LP-EGR is routed through LP-EGR passage 149 from downstream of turbine 176 to upstream of compressor 174. The amount of LP-EGR provided to intake manifold 144 may be varied by controller 12 via LP-EGR valve 152. The LP-EGR system may include LP-EGR cooler 158 to reject heat from the EGR gases to engine coolant, for example.

One or more sensors 159 may be positioned within LP-EGR passage 149 to provide an indication of one or more of a pressure, temperature, and air-fuel ratio of exhaust gas recirculated through the LP-EGR passage. Exhaust gas diverted through LP-EGR passage 149 may be diluted with fresh intake air at a mixing point located at the junction of LP-EGR passage 149 and intake passage 142. In some examples, where an air intake system (AIS) throttle is included in intake passage 142, upstream of compressor 174, by adjusting LP-EGR valve 152 in coordination with the air intake system throttle, a dilution of the EGR flow may be adjusted.

A percent dilution of the LP-EGR flow may be inferred from the output of a sensor in the engine intake gas stream. For example, a sensor 145 positioned downstream of LP-EGR valve 152, and upstream of main intake throttle 20, may be used so that the LP-EGR dilution at or close to the main intake throttle may be accurately determined. Sensor 145 may be, for example, an oxygen sensor such as a UEGO sensor.

Each cylinder of engine 10 may include a spark plug 192 for initiating combustion. Ignition system 190 can provide an ignition spark to combustion chamber 30 via spark plug 192 in response to spark advance signal SA from controller 12, under select operating modes. In particular, in response to the spark signal from the controller, ignition system 190 may apply a high-voltage bias across spark plug 192 to enable ionization sensing. The high-voltage bias may be applied across the spark gap and may be applied prior to ignition coil dwell. During selected conditions, an additional high-voltage bias may be applied during ignition coil dwell. Ignition system 190 may include one or more ignition coils and other circuitry/electronics to actuate the associated spark plug and provide ion sensing, such as an ion sensing module 194. The ion sensing module may include an ion sensor. Alternatively, the spark plug may be used for ion sensing. Charging of the ignition coil may be powered by a high-voltage power supply (not shown) or by battery voltage. Use of a boosted voltage provided by a high-voltage power supply may provide various advantages, such as reducing ignition coil charge time and dwell time, which generally allows greater ignition timing flexibility and/or a longer ionization sensing period.

In one embodiment, each spark plug includes a dedicated coil and associated electronics to provide sparking and ion sensing. Alternatively, a single ignition module may be associated with multiple spark plugs with ionization sensing provided using a power pair arrangement to reduce the number of necessary control lines. The depicted embodiment illustrates a single spark plug in each cylinder that functions to ignite the fuel mixture. However, the present disclosure may be used in applications that use dual spark plugs with one or both providing mixture ignition and/or ion sensing.

An engine control system including controller 12 may be configured to control the ignition system so that a single ignition spark is performed by the spark plug to initiate combustion of a fuel and/or fluid mixture within the combustion chamber. In some embodiments, the control system may be configured to control spark plug 192 so that multiple sparks are performed. For example, multiple sparks may be used to ensure complete combustion of the fluid and fuel mixture and/or to increase the temperature of the spark plug.

Controller 12 may include code implemented by software and/or hardware to monitor an ionization current of the spark plug to determine if a spark plug fouling condition has occurred or is anticipated. As discussed further below with reference to FIGS. 2-4 and FIG. 6, in response to an indication of spark plug fouling (actual or anticipated), controller 12 may employ various corrective actions or control procedures to burn off soot deposited on the fouled spark plug. Control procedures to remove spark plug deposits may include frequently discharging the ignition coil during engine spin-down, during engine rest, as well as prior to an engine start, utilizing alternative camshaft timing (e.g., late exhaust valve opening), and adjusting (e.g., advanced or retarded) spark timing from a nominal timing. The controller may select the discharge schedule, cam timing schedule, and spark timing schedule based on whether the engine is in a green state (such as when the vehicle is in a pre-delivery mode and is still at the assembly plant) or in a non-green state (such as when the vehicle is in a post-delivery mode and has left the assembly plant). The various control actions are used alone or in combination to raise the spark plug tip temperature and burn off accumulated soot, thereby addressing further spark plug fouling.

In some embodiments, each cylinder of engine 10 may be configured with one or more fuel injectors for providing fuel thereto. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. It will be appreciated that, in an alternate embodiment, injector 166 may be a port injector providing fuel into the intake port upstream of cylinder 30.

It will be appreciated that in still further embodiments, the engine may be operated by injecting a variable fuel blend or knock/pre-ignition suppressing fluid via two injectors (a direct injector 166 and a port injector) and varying a relative amount of injection from each injector.

Fuel may be delivered to fuel injector 166 via a high pressure fuel system 80, including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

Fuel may be delivered by the injector(s) to the cylinder during a single engine cycle of the cylinder. Further, the distribution and/or relative amount of fuel delivered from the injector(s) may vary with operating conditions. For example, the distribution may vary with a rate of change of a cylinder aircharge, a nature of an abnormal cylinder combustion event (such as whether there is a cylinder misfire event, knock event, or pre-ignition event). Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such, each cylinder may similarly include its own set of intake/exhaust valves, fuel injector(s), spark plug(s), etc.

Fuel tanks in fuel system 80 may hold fuel or knock suppressing fluids with different qualities, such as different compositions. These differences may include different alcohol content, different water content, different octane, different heats of vaporization, different fuel blends, and/or combinations thereof, etc. In one example, fuels or knock suppressing fluids with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline, etc. In still another example, both fuels may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. In yet another example, one of the fluids may include water while the other fluid is gasoline or an alcohol blend. Additionally, the first and second fuels may also differ in other fuel qualities such as a difference in temperature, viscosity, octane number, heat of vaporization, etc. Still other knock suppressing fluids may include water, methanol, washer fluid (which is a mixture of approximately 60% water and 40% methanol), etc.

Moreover, fuel characteristics of the fuel or knock suppressing fluid stored in the fuel tank may vary frequently. In one example, a driver may refill the fuel tank with E85 one day, and E10 the next, and E50 the next. The day to day variations in tank refilling can thus result in frequently varying fuel compositions, thereby affecting the fuel composition delivered by injector 166.

Engine 10 may further include one or more knock sensors, accelerometers, vibrations sensors, or in-cylinder pressure sensors to sense engine block vibrations, such as those related to knock or pre-ignition. Further, the accelerometers, vibrations sensors, in-cylinder pressure sensors, and ionization sensors (not shown) may be used to indicate a cylinder misfire event (such as a cylinder misfire event triggered by spark plug fouling) and distinguish the misfire event from knock or pre-ignition events.

Controller 12 is shown in FIG. 1 as a microcomputer, including microprocessor unit 106, input/output ports 108, an electronic storage medium for executable programs and calibration values (shown as read only memory chip 110 in this particular example), random access memory 112, keep alive memory 114, and a data bus. Controller 12 may receive various signals from sensors coupled to engine 10 in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124; cylinder AFR from EGO sensor 128; spark plug ionization current from an ionization sensor of ionization sensing module 194; and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold. Still other sensors such as cylinder pressure sensors, and knock sensors may be coupled to engine 10 (e.g., to an engine block) to help in the identification and differentiation of abnormal combustion events. The controller 12 receives signals from the various sensors of FIG. 1 and employs the various actuators of FIG. 1 to adjust engine operation based on the received signals and instructions stored on a memory of the controller. For example, based on spark plug soot load being elevated, and/or spark plug tip temperature being low, the controller may adjust a timing and duration of a discharge signal sent to the spark plug to vary (e.g., increase) a duty cycle of the spark plug. Storage medium read-only memory 110 can be programmed with computer readable data representing instructions executable by processor 106 for performing the methods described below as well as other variants that are anticipated but not specifically listed.

In this way, the system of FIG. 1 enables a system for a vehicle comprising an engine including a cylinder; a direct injector; a spark plug including an ignition coil for delivering spark to the cylinder; and a controller with computer-readable instructions stored on non-transitory memory for: for a first engine shutdown and a number of engine shutdowns thereafter of the vehicle following vehicle assembly, operating the engine with spark discharged repetitively as the engine spins down to rest, unfueled, a frequency and a duty cycle of spark discharge based on an estimated soot load of the spark plug. In the preceding example, additionally or optionally, the controller includes further instructions for: increasing the frequency and duty cycle of the spark discharge as the estimated soot load increases. Additionally or optionally, the operating with spark discharged repetitively includes operating before an indication of spark plug fouling is received. The controller may include further instructions for: after the number of engine shutdowns have elapsed, selectively operating the engine with spark discharged repetitively as the engine spins down to rest responsive to the indication of spark plug fouling. Additionally or optionally, the system may further comprise intake and/or exhaust cams coupled to a valve of the cylinder, and the controller may include further instructions for: after the number of engine shutdowns have elapsed, responsive to the indication of spark plug fouling, operating the engine with spark timing advanced from a nominal timing and cam timing adjusted to delay exhaust valve opening.

Figure 2:
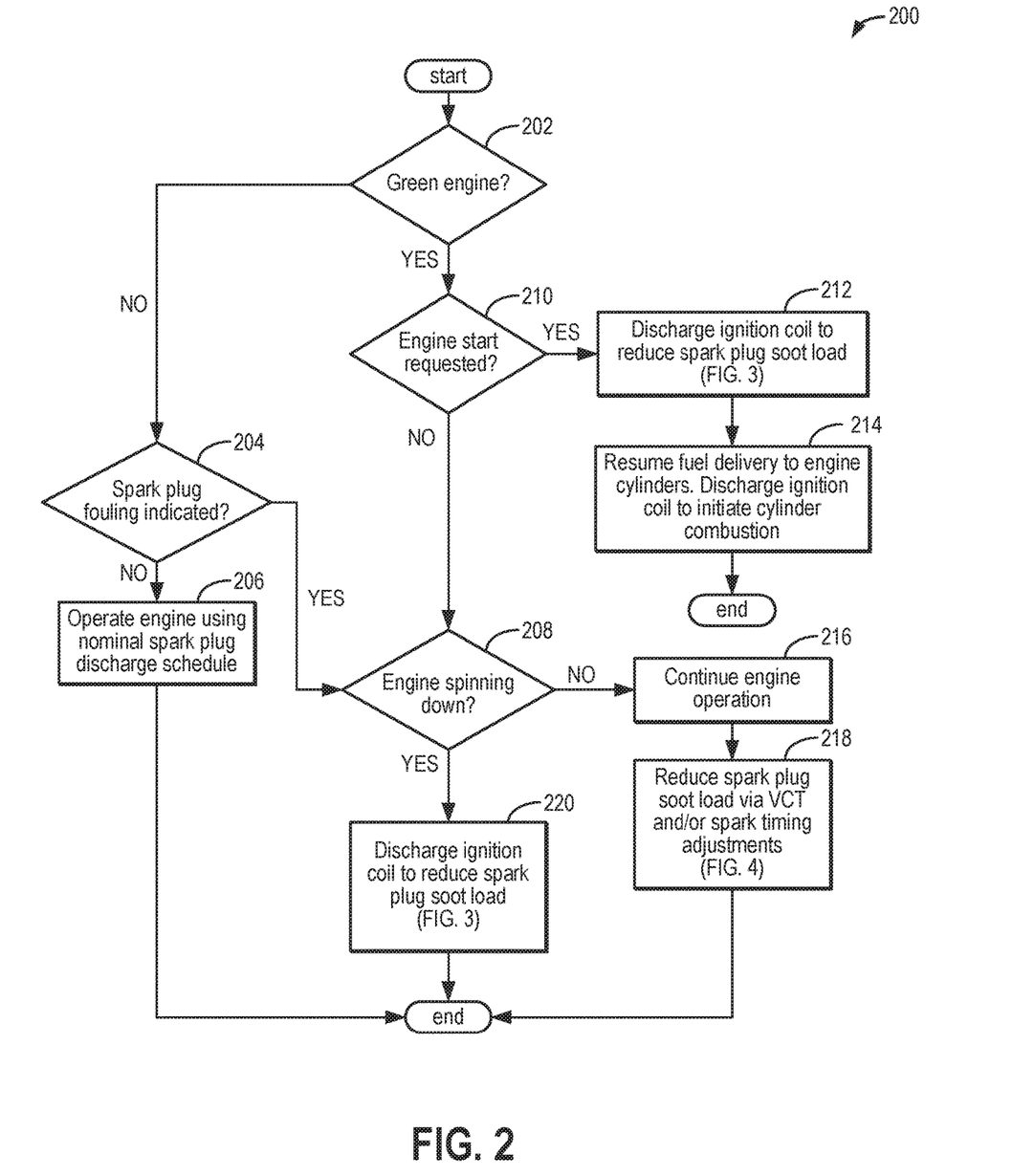
FIG. 2 shows a high level flow chart for adjusting a spark plug ignition coil discharge schedule to reduce spark plug fouling issues in a green and a non-green engine.

Turning now to FIG. 2, an example method 200 for spark plug cleaning is illustrated. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, it is determined if the engine (e.g., engine 10 of FIG. 1) is in a green engine condition. As such, a green engine condition is confirmed when the engine is coupled to a vehicle in a pre-delivery state, at an assembly plant. In one example, a green engine condition may be determined based on a number of key-on events that have elapsed as well as a duration of each key-on event (that is, a duration elapsed between key-on and key-off for each key-on event). For example, the engine may be a green engine on a drive cycle after a first green engine start (or a number of engine starts after the first green engine start) following vehicle assembly and before the vehicle leaves the assembly plant. As such, while the engine is still a green engine, various tests may be performed on the engine to assess engine component function. In addition, various functions may be diagnosed, such as emissions compliance, leak detection, etc., by moving the vehicle from one station to another station at the assembly plant.

One example of determining a green engine condition based on a number of key-on events may include determining whether a specified engine run time has elapsed since an initial key-on event following vehicle assembly. A green engine condition may be confirmed during an initial key-on event, and for a further number of key-on events that occur within the engine run time since the initial key-on event. As another example, a green engine condition may be confirmed based on an integrated value of a number of key-on events since the initial key-on event, and a duration of each of the number of key-on events. If the integrated value is less than a threshold duration, the engine may be in a green condition. After the threshold duration, the engine may be determined to be in a non-green condition. As such, it is expected that by the threshold duration, or the threshold number of key-on events, the vehicle encompassing the engine has left the assembly plant and has been delivered to a customer/operator (that is, the engine is in a post-delivery state). In an alternate example, it may be determined if a threshold number of miles has been driven since the first key-on event following vehicle assembly. If the threshold number of miles has not been driven, the engine may be considered to be in the green condition, else the engine may be considered to be in the non-green condition.

If the engine is not in a green engine condition, then at 204, it may be inferred that the engine is in a non-green condition and it may be determined if there is an indication of spark plug fouling in the non-green engine. In one example, spark plug fouling may be indicated based on the occurrence of one or more cylinder misfire events. In another example, spark plug fouling may be indicated based on the ionization current of the spark plug (e.g., spark plug 192 of FIG. 1) or the output of an ion sensor coupled to the spark plug (e.g., ion sensing module 194 of FIG. 1). For example, if the ionization current is higher than a threshold, spark plug fouling due to soot accumulation may be determined. As such, a steady-state ionization signal (e.g., current) prior to energization of the ignition coil of the spark plug, also referred to as the pre-dwell phase, exceeds the threshold. The pre-dwell ionization signal provides a measurement of the shunt resistance, which reduces as conductive carbon-containing deposits (soot) form on the spark plug. If the ionization current is higher than the threshold, it indicates a lowered shunt resistance due to spark plug fouling. Spark plug fouling and a need for spark plug cleaning may alternatively be inferred based on one or more of a spark plug tip temperature model, time elapsed since start, and time elapsed since operating the engine at a condition where self-cleaning of the spark plug does not occur (such as at lower than threshold engine speeds and loads).

If spark plug fouling is not indicated, method 200 proceeds to 206, and engine operation is continued with nominal spark timing (or an alternate spark timing based on the estimated engine operating conditions) being supplied to the engine cylinders. For example, the ignition coil may be discharged to initiate fuel combustion at or near minimum spark advance for best torque (MBT) or an alternate optimal ignition timing for maximal engine power and efficiency for the given engine operating conditions. Following 206, method 200 ends. If spark plug fouling is indicated at 204, the method proceeds to 208, as described further below.

Returning to 202, if it is determined that the engine is a green engine, method 200 proceeds to 210. At 210, the method involves determining if engine restart is requested for the green engine at rest. In one example, a green engine restart may be requested responsive to the vehicle being moved to an end of line station at the assembly plant where the engine is started and one or more engine components are tested. As another example, a green engine restart may be confirmed responsive to a vehicle key-on event at the assembly plant or insertion of an active or passive key of the vehicle. In another example, opening of the vehicle door at the assembly plant may signal an imminent green engine restart. The controller may further determine that the engine start is green start if the current engine start is requested within a threshold number of engine starts since a very first engine start of the vehicle since the initial assembly of the vehicle.

If a green engine restart is confirmed, the method proceeds to 212 where the routine includes opportunistically discharging the ignition coil before starting the engine. As elaborated with reference to FIG. 3, the ignition coil may be discharged a number of times responsive to an imminent engine start, before the engine is started, to raise tip temperatures and reduce the soot load of the spark plug. A duty cycle of the discharging, as well as a discharge time, may be adjusted based on the estimated soot load of the spark plug of the green engine. In addition, the duty cycle may be adjusted based on the time available until fuel delivery is resumed in the engine. Then, at 214, the method includes resuming fuel delivery to engine cylinders and discharging the ignition coil to initiate cylinder combustion and restart engine spinning. Following 214, method 200 ends.

As such, during cranking, spark advance may impede engine start by producing negative torque on the crankshaft, as described with reference to FIG. 4. Therefore, the use of an alternative spark timing schedule for heating the spark plug may be limited to smaller advancements from MBT during cranking (as compared to non-cranking), which may have a negligible effect on the spark plug temperature. Cam timing adjustments may also not provide sufficient heating because the cams are typically oil driven and there is insufficient oil pressure at start, making cam movement unreliable during the start. Therefore, during engine cranking, multiple spark discharge is advantageously used to raise spark plug tip temperatures.

If the engine is not at rest and a restart has not been requested, at 208, it is determined if the engine is spinning down to rest. The engine may be spinning down to rest responsive to an engine (or vehicle) shutdown command, such as may occur during an engine key-off event. During the engine spin-down, the engine is operating unfueled, and cylinder combustion has been discontinued. If the engine is not spinning down or at rest, method 200 proceeds to 216, and nominal engine operation at the assembly plant continues.

Figure 4:
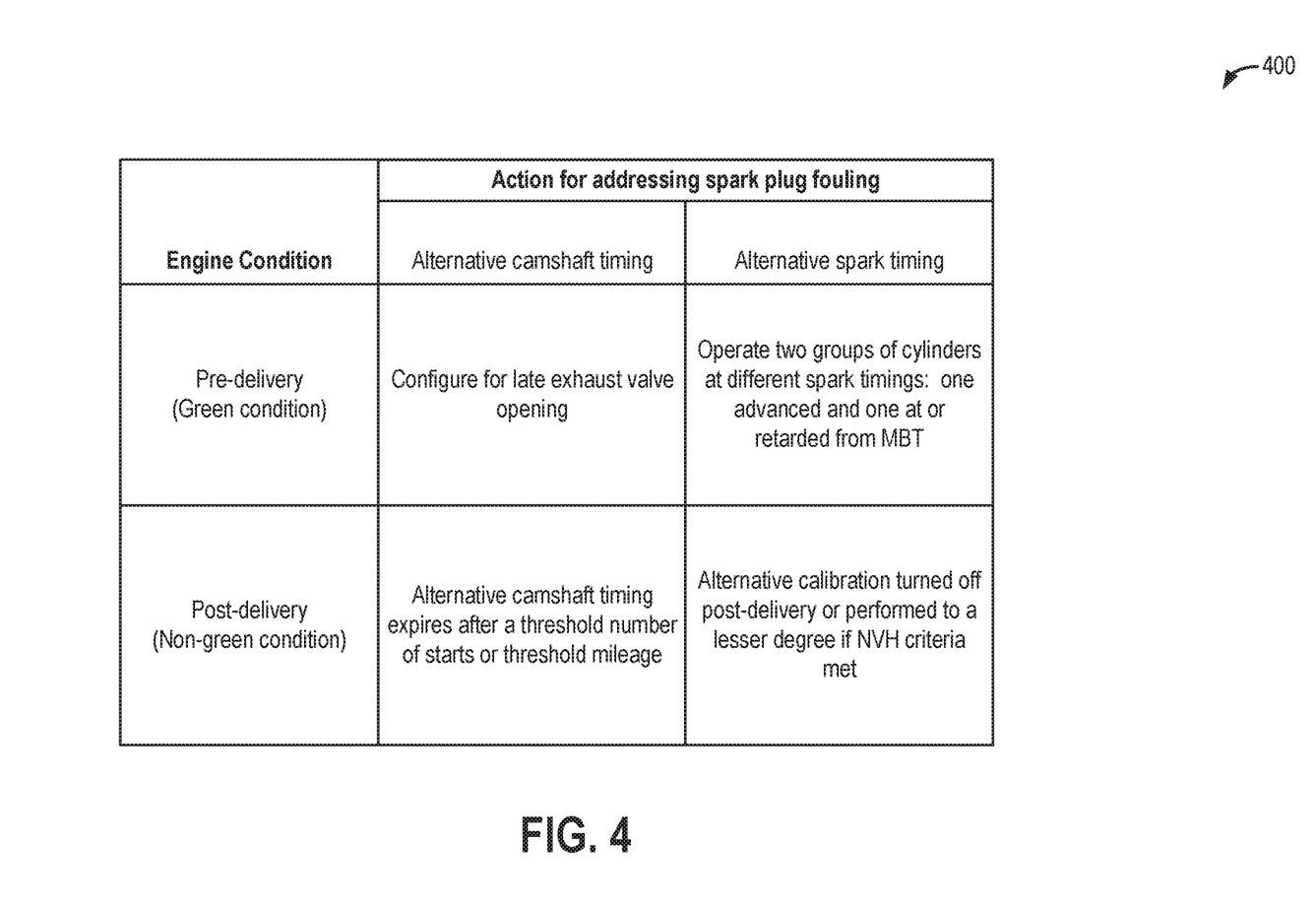
FIG. 4 shows a table comparing distinct spark and cam timing adjustments that may be used for addressing spark plug fouling during engine operation in pre-delivery and post-delivery states.

At 218, the controller may reduce the spark plug soot load of the running green engine via spark and/or cam timing adjustments, as elaborated with reference to FIG. 4. This includes adjusting a VCT system to provide late exhaust valve opening and/or advancing spark ignition timing. The amount of spark advance and/or cam timing retard applied may be adjusted based on the estimated soot load of the green engine's spark plug. The routine then ends.

If, at 208, the engine is spinning down, method 200 proceeds to 220, wherein the spark plug soot load is reduced by raising the spark plug tip temperature via intermittent ignition coil discharge, as discussed at 212, and detailed with reference to FIG. 3. Following 220, the method ends.

In this way, responsive to an engine shutdown request (e.g., at 208), after disabling cylinder fueling, the controller may intermittently discharge an ignition coil of a spark plug, discharge parameters of the discharging determined based on a soot load of the spark plug. Likewise, in response to an engine restart request (e.g., at 210), such as following the engine shutdown request, the ignition coil of the spark plug may be intermittently discharged before resuming engine fueling on a first combustion event since the engine restart request. The discharge parameters may be further adjusted based on the pre-delivery or post-delivery state of the vehicle, such as may be determined based on a number of engine starts that have elapsed since a first green engine start following vehicle assembly at a plant.

Figure 3:
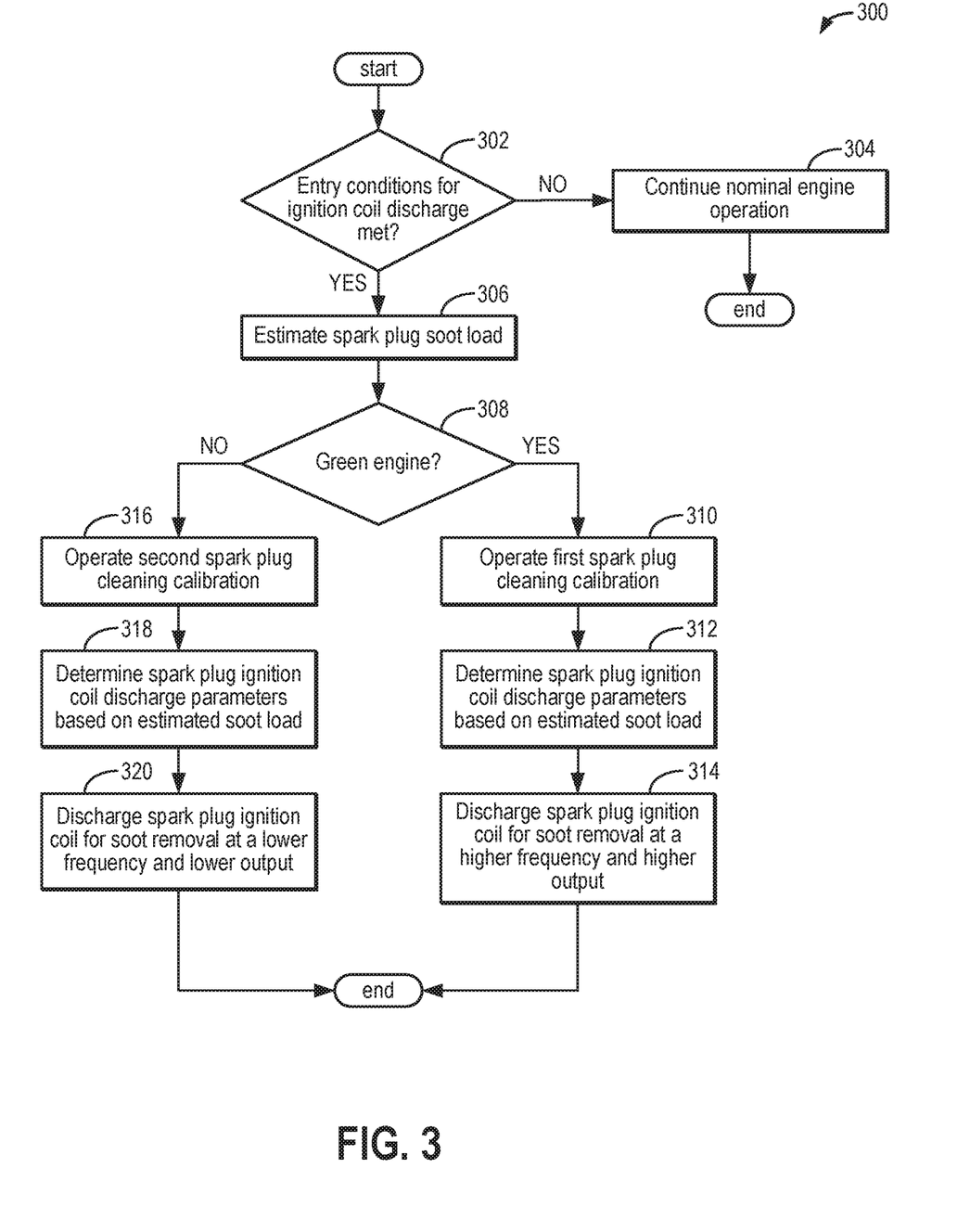
FIG. 3 shows a flow chart for discharging a spark plug ignition coil for spark plug cleaning during engine spin-down, with distinct calibrations applied during pre-delivery and post-delivery states.

Turning now to FIG. 3, a method for opportunistic spark plug cleaning during engine spin down and while an engine is at rest before an engine restart is illustrated. The method relies on intermittent discharging of a spark plug ignition coil during engine non-fueling conditions, where the spark event will not trigger a combustion event, to raise spark plug tip temperatures and burn off accumulated soot. The method enables spark plug cleaning to be performed while the engine is shutdown or at rest. By calibrating the discharge schedule differently when the engine is green (still at an assembly plant, see spark schedule B of FIG. 6) versus when the engine is not green (has left the assembly plant, see spark schedule D of FIG. 6), spark plug fouling issues of the engine in the pre-delivery and the post-delivery state may be addressed without degrading exhaust emissions or fuel economy in either state.

At 302, the method begins by determining if entry conditions for spark plug cleaning via ignition coil discharge are met. Entry conditions may be considered met when the engine is not being fueled, such as while the engine is at rest or is spinning down to rest. In one example, entry conditions may be considered met when the engine is spinning down to rest responsive to an engine shutdown command. In another example, entry conditions may be considered met when the engine is at rest and before fuel delivery is resumed following an engine restart command. It will be appreciated that in a green engine, where the vehicle is still at an assembly plant, entry conditions for spark plug cleaning may be considered met during engine spin-down and engine restart events opportunistically, before an indication of spark plug fouling is received. In comparison, in a non-green engine, where the vehicle has left the assembly plant, entry conditions for spark plug cleaning may be considered met during engine shutdown and engine restart events following the receipt of an indication of spark plug fouling. If the entry conditions are not met (e.g., combustible material is present in the engine cylinder, including fuel or fuel residues), method 300 proceeds to 304 wherein the method includes continuing nominal engine operation. Following 304, method 300 ends.

If the entry conditions for initiating ignition coil discharge are met, at 306, the method includes estimating or measuring the spark plug soot load. The soot load may be a measured soot load, estimated via a particulate matter sensor or based on the ionization current of the spark plug. Alternatively, the soot load may be an inferred soot load, the output of an ion sensor coupled to the spark plug, and/or based on engine operating conditions such as duration of operation at a given engine speed-load or at a given air-fuel ratio. As an example, as a duration of engine operation in lower engine speed-loads increases, the inferred soot load may be increased due to insufficient heat being generated for soot burning. As another example, as a duration of engine operation with a richer than stoichiometric air-fuel ratio increases, the inferred soot load may be increased due to the generation of more particulate matter. The controller may refer a look-up table or algorithm that models the inferred soot load by using the engine speed, engine load, and combustion air-fuel ratio as input parameters.

At 308, after estimating the soot load, the method includes determining if the engine is in a green engine condition. As discussed with reference to FIG. 2, the engine may be determined to be in a green condition when the vehicle is in a pre-delivery state at the assembly plant and while less than a threshold number of combustion events, engine starts, or driven miles have elapsed on the engine since initial vehicle assembly. In comparison, the engine may be determined to not be in the green condition when the vehicle is in a post-delivery state after having left the assembly plant and while more than the threshold number of combustion events, engine starts, or driven miles have elapsed on the engine since the initial vehicle assembly. As elaborated herein, the discharge schedule applied for spark plug cleaning may vary based on the pre- or post-delivery state of the vehicle engine in addition to the spark plug soot load. This is due to the green engine being started multiple times to move the vehicle multiple times by short distances at the assembly plant. The frequent, short trips may not generate sufficient engine heat, making the green engine more prone to spark plug fouling. Therefore, the controller may calibrate the spark plug cleaning more aggressively in the pre-delivery state. While more heat may be generated in the non-green engine after vehicle delivery from the assembly plant, the heating may be insufficient to clear carbon accumulating near the center electrode of the spark plug. This may be addressed by the controller calibrating the spark plug cleaning less aggressively in the post-delivery state.

If the engine is determined to be a green engine, at 310, the method includes operating the engine in accordance with a first spark schedule to provide a first spark plug cleaning calibration. The first spark plug cleaning calibration may be set to more aggressively remove spark plug deposits and pre-empt spark plug fouling. This first, more aggressive calibration may expire after a predefined number of engine starts since a first green start of the engine (following vehicle assembly), after a threshold number of combustion events have elapsed, or after a threshold number of miles have been driven. Alternatively, the first calibration may be disabled (by a service technician at the assembly plant or vehicle dealership) upon vehicle delivery (e.g., when the engine transitions to a non-green state).

At 312, the discharging includes setting one or more discharge parameters for the discharging based on the estimated soot load of the spark plug, and further based on the green engine condition (or vehicle pre-delivery state). The discharge parameters may include one or more (or each) of a frequency of discharging the ignition coil, a duty cycle of the discharging, a charge and discharge time, and a discharge current. Each of the frequency of discharging the ignition coil, the duty cycle of the discharging, the charge and discharge time, and the discharge current may be increased as the estimated soot load of the spark plug increases. In addition, one or more or each of the frequency of discharging the ignition coil, the duty cycle of the discharging, the charge and discharge time, and the discharge current may be increased (e.g., by a factor) responsive to the engine being in the green condition.

At 314, the ignition coil is discharged based on the discharge parameters determined at 312 to clean the spark plug of the green engine before an indication of spark plug fouling is received. Notably, at 314, the ignition coil discharge may occur at a higher frequency and/or with a higher output in the green engine operating with the first spark plug cleaning calibration. As discussed earlier, the discharging is performed intermittently responsive to an engine shutdown request, the discharging performed while the engine spins down to rest as well as while the engine is (subsequently) at rest. In addition, the discharging is performed in response to an engine restart request, with the ignition coil of the spark plug being intermittently discharged before resuming fueling on a first combustion event since the engine restart request. Following 314, method 300 ends.

In one example, the first calibration schedule may be applied opportunistically for a number of engine start and shutdown events of the green engine, and then the controller may automatically transition the engine to the second calibration schedule without requiring input from an operator or service technician. For example, the spark plug ignition coil may be discharged according to the first discharge schedule having a higher discharge frequency and a larger discharge duty cycle until an integrated value based on a number of engine start events since assembly of the vehicle and a duration of each of the number of engine starts is higher than a threshold value. Then, after the integrated value is higher than the threshold value, the discharging may be performed opportunistically according to a second spark schedule having a lower discharge frequency and a smaller discharge duty cycle. In one example, the threshold value may be adjusted based on the alcohol content of the fuel injected into the engine, the threshold value raised as the alcohol content of the injected fuel increases on account of alcohol being less prone to fouling. In another example, the threshold value may be adjusted based on a seasonal grade of the fuel, such as based on whether the fuel blend is a winter blend versus a summer blend. The threshold value may be lowered when fuel usage at the assembly plant is switched to a winter blend on account of the winter blend being more prone to fouling. In still another example, the threshold value may be adjusted based on a split ratio of fuel delivered into the engine via port injection relative to direct injection during the preceding engine start, the threshold value raised as the ratio of port injected fuel increases on account of PFI being less prone to fouling (due to the lower generation of soot or other particulate matter via port injection of fuel).

If the engine is not determined to be a green engine, at 316, the method includes operating the engine in accordance with a second spark schedule to provide a second spark plug cleaning calibration. The second spark plug cleaning calibration may be set to less aggressively remove spark plug deposits and address spark plug fouling after an indication of spark plug fouling is received. This second, less aggressive calibration may be the default calibration of the engine following vehicle delivery and may be automatically enabled when the first calibration is disabled.

At 318, the discharging includes setting one or more discharge parameters for the discharging based on the estimated soot load of the spark plug, and further based on the non-green engine condition (or vehicle post-delivery state). The discharge parameters may include one or more (or each) of a frequency of discharging the ignition coil, a duty cycle of the discharging, a charge and discharge time, and a discharge current. Each of the frequency of discharging the ignition coil, the duty cycle of the discharging, the charge and discharge time, and the discharge current may be increased as the estimated soot load of the spark plug increases. In addition, one or more or each of the frequency of discharging the ignition coil, the duty cycle of the discharging, the charge and discharge time, and the discharge current may be decreased (or increased by a smaller factor as compared to the first calibration) responsive to the engine being in the non-green condition.

At 320, the ignition coil is discharged based on the discharge parameters determined at 318 to clean the spark plug of the non-green engine responsive to the indication of spark plug fouling. Notably, at 320, the ignition coil discharge may occur at a lower frequency and/or with a lower output in the non-green engine operating with the second spark plug cleaning calibration. With reference to the earlier example, the discharging may be performed according to the second spark schedule having the lower discharge frequency and the smaller discharge duty cycle. Following 320, method 300 ends.

In one example, while a vehicle is in a pre-delivery state at an assembly plant, the engine may be operated according to a first spark schedule responsive to the inferred soot load being higher than a first threshold (see FIG. 6, schedule A). In comparison, while the vehicle is in a post-delivery state outside the assembly plant, the engine may be operated according to a second, different spark schedule responsive to the inferred soot load being higher than a second threshold (see FIG. 6, schedule C). The first threshold may be higher than the second threshold. In this way, spark plug fouling issues in a vehicle engine can be addressed using opportunistic spark discharge without degrading exhaust emissions or fuel economy.

Turning now to FIG. 4, table 400 shows still other example spark plug cleaning actions that may be performed in an engine coupled in a vehicle when the vehicle is in a pre-delivery state (or green engine condition) relative to when the vehicle is in a post-delivery state (or non-green engine condition). The actions of table 400 may be performed as part of the method of FIG. 2, such as at 218. Specifically, table 400 shows actions that may be performed when the engine is operating fueled, when the ignition coil discharge method of FIG. 3 cannot be performed.

For example, a spark plug may be cleaned through use of an alternative camshaft timing schedule. As discussed above with reference to FIG. 1, a VCT device may be actuated to adjust the exhaust and/or intake valve timing of one or more engine cylinders. As part of a pre-delivery calibration, it may be desirable to operate the vehicle engine (such as engine 10 of FIG. 1) with the camshaft timing configured for late exhaust valve opening (EVO). The technical effect of late EVO is that heat is held in the combustion chamber for a longer duration, which may raise the temperature of the spark plug and burn away soot to reduce spark plug fouling. This alternative camshaft timing calibration may expire after the vehicle is delivered to a customer (e.g., after a threshold number of starts or threshold mileage has elapsed since a first green start of the engine). A degree of retard in opening the exhaust valve may be adjusted based on the estimated soot load of the green engine spark plug. For example, the EVO may configured to be later as the estimated soot load increases. In comparison, in the post-delivery state, a nominal cam timing may be maintained. Alternatively, exhaust valve opening may be delayed by a smaller amount and/or may be applied for a shorter duration or on a fewer number of cylinders.

As another example, spark plug fouling may be addressed using an alternative spark timing schedule. MBT refers to the optimal ignition timing for maximal engine power and efficiency for a given engine operating condition. If spark timing is either advanced or retarded from MBT, engine torque is reduced. Typically when spark is advanced of MBT, heat is transferred to the spark plug, engine coolant, and the combustion chamber. In comparison, when spark is retarded from MBT, heat is transferred to the exhaust due to the burn occurring later in the cycle. The ignition timing can be adjusted (for example, to increase the temperature of the spark plug) at the expense of engine and fuel efficiency to enable spark plug cleaning. In a pre-delivery state, poor noise, vibration, and harshness (NVH) characteristics caused by running the engine in an inefficient state may not observed by a customer. Therefore, it may be advantageous to alter ignition timing in a green engine in order to raise the temperature of the spark plug to burn off soot and prevent spark plug fouling. In comparison, in the post-delivery state, spark timing may be less advanced and/or may be supplied for a shorter duration. As with the alternative cam timing calibration, the alternative spark timing calibration for spark plug cleaning may expire post-delivery, after the vehicle is delivered to a customer (e.g., after a threshold number of starts or threshold mileage has elapsed since a first green start of the engine).

It will be appreciated that in a further implementation, spark plug cleaning via spark timing adjustments may include operating a fraction of the engine cylinders with spark timing advanced and a remaining fraction of the engine cylinders with spark timing at or retarded from MBT. For example, one engine cylinder (or a first group of engine cylinders) may be operated with a spark timing well advanced of MBT (e.g., with a first amount of spark advance). A second group of engine cylinders (the remaining cylinders) may be operated with a spark timing at or retarded from MBT. The first group of cylinders operating with spark advance produce negative torque on the crankshaft (e.g., crankshaft 140 of FIG. 1) since they try to rotate the crankshaft in a direction opposite to the default direction that generates positive torque. That is, the spark placement is such that it applies a downward force on the piston (such as piston 138 of FIG. 1) as it is coming up to top dead center (TDC), which attempts to send the crankshaft in the opposite direction (e.g., counter clockwise). Therefore, the cylinders operating with spark timing at or retarded from MBT have to cancel out the negative torque of the cylinder(s) with advanced spark timing in addition to generating enough positive torque so that the total engine torque output is met. In order to make enough positive torque to meet the total engine torque output, the engine requires additional total air flow and fuel (e.g., more energy must enter the engine), making this method of engine operation inefficient compared to running at or near MBT. The additional energy input results in more heat generation in the cylinder and thus more heat available to heat the spark plug and burn off soot deposits. The spark placement for the neutral or retarded cylinders is such that it applies a downward force on the piston (such as piston 138 of FIG. 1) as it is going down towards bottom dead center (BDC), which assists the crankshaft motion in the same direction as intended (e.g., clockwise). Specifically, the cylinder(s) with spark timing advanced from MBT will have a greater increase in spark plug temperature because spark advance increases combustion temperature whereas spark retard increases exhaust temperature. Therefore, the spark schedule may be alternated in this calibration (e.g., advanced cylinders become neutral or retarded and vice versa) so that all of the spark plugs could be sufficiently cleaned. For example, the first group of cylinders may be operated with spark advance while operating the second group of cylinders with spark neutral or retarded for a duration. A degree of spark advance applied for the first group of cylinders may be adjusted based on the soot load to provide the desired level of heating, and may be further adjusted based on the total number of cylinders in each group. Thus, when the first group of cylinders has a smaller number of cylinders than the second group of cylinders, each cylinder of the first group may be operated with a larger degree of spark advance. After the duration, the first group of cylinders may be operated with spark neutral or retarded while operating the second group of cylinders with spark advance for another duration. The same may be reiterated until the spark plug of each cylinder has been sufficiently cleaned and the spark plug soot load has been sufficiently reduced. The calibration applied for the spark timing adjustments in the pre-delivery state may vary from the calibration applied during the post-delivery state. For example, the degree of spark advance and spark retard applied during the pre-delivery state may be larger than the corresponding degrees of spark advance and retard applied during the post-delivery state. As another example, the duration of performing the calibration in the pre-delivery state may be longer than that applied during the post-delivery state. In other words, the spark plug fouling mitigating actions may be performed to a lesser degree during the post-delivery calibration, as long as NVH criteria are met.

As an example, the controller may operate a first group of cylinders with a higher degree of spark advance (with spark timing advanced further of MBT timing) for the purpose of creating negative torque to the crankshaft and load a remaining, second group of cylinders to a higher cylinder air charge load for the purpose of running inefficiently and requiring more air and fuel. Further, the first group of cylinders may be operated highly advanced of MBT timing for the purpose of transferring more heat to the advanced cylinders' spark plugs. The controller may also run the first group of cylinders highly advanced of MBT timing for the purpose of making a second group of cylinder operating with spark neutral or retarded work harder, thereby increasing air and fuel flow to release additional energy and generate heat for the entire engine to warm up spark plugs. The controller may run the second group of remaining cylinders at or retarded of MBT timing to provide an optimal balance of NVH, heat transfer to the plug, and energy consumption to achieve a desired spark plug temperature and cleaning. Switching of the advanced and neutral or retarded sets of cylinders may be performed to achieve the desired heating effect. The switching may be performed in accordance with "round robin" or "carousel schemes", as an example. The degree of spark advance and spark retard applied to the cylinders may be limited such that the cylinder pressures created do not exceed a maximum cylinder pressure for the given engine design. Further, the degree of spark advance applied to the cylinders may be limited such that the net load created on the engine does not exceed a knocking level that may cause engine damage. By using an optimal combination of ignition coil discharge during engine spin-down, late EVO, and spark timing advance, spark plug temperatures may be raised, thereby maintaining a spark plug tip temperature high enough to burn off accumulated soot, even when engine load is low or when the engine is operated intermittently at an assembly plant. In addition, more intense adjustments may be performed in the pre-delivery state without causing NVH and driveability issues that are objectionable to a vehicle operator. In comparison, in the post-delivery state, less intense adjustments may be performed to reduce vehicle driveability and NVH issues that may be objectionable to the operator.

Figure 5:
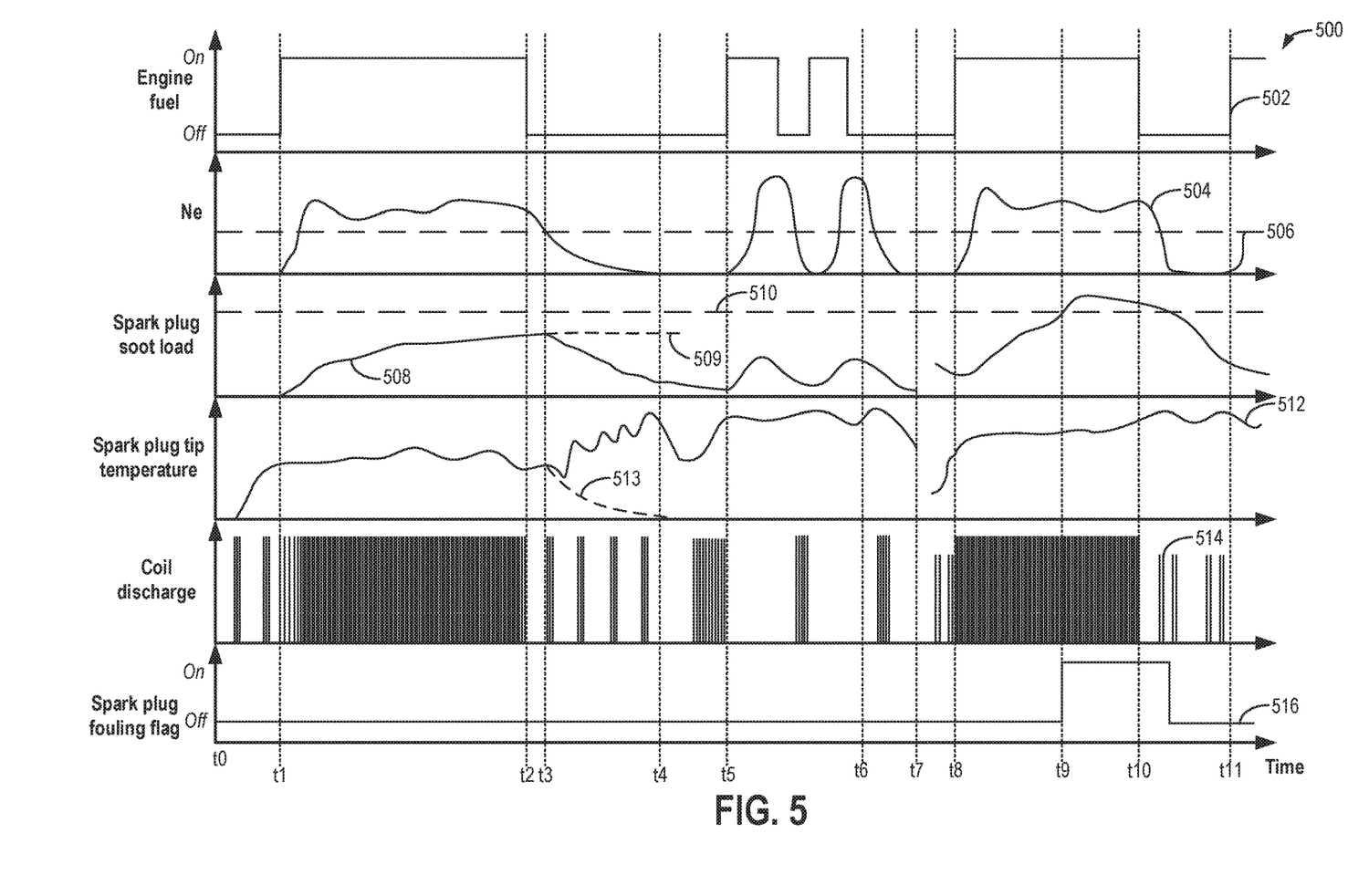
FIG. 5 shows an example ignition coil discharge schedule performed to address spark plug fouling in an engine.

Graph 500 of FIG. 5 displays an example timing diagram illustrating how a spark plug ignition coil may be discharged during engine spin-down and rest in order to raise the spark plug tip temperature and burn off accumulated soot in a green engine.

Engine fuel delivery is shown at plot 502, engine speed is shown at plot 504, spark plug soot load is shown at plot 508, spark plug tip temperature is shown at plot 512, ignition coil discharge events are shown at plot 514, and a spark plug fouling flag is shown at plot 516. Additionally, an engine speed threshold for engine spin-down is represented as dashed line 506, and a spark plug soot load threshold is represented as dashed line 510. For all of the above, the X-axis represents time, with time increasing along the X-axis from left to right. The Y-axis of each individual graph corresponds to the labeled parameter, with the value increasing from bottom to top, with the exceptions of plot 502, in which the Y-axis reflects whether fuel is delivered to an engine (on or off), and plot 516, in which the Y-axis reflects whether a spark plug fouling flag is set (on) or not (off).

Prior to t0, the engine may be assembled into a vehicle at an assembly plant. Subsequently, the engine may be operated to assess various engine and vehicle functions as well as to frequently move (e.g., marshaling of) the vehicle. At t0, an engine start may be anticipated (e.g., a vehicle door is opened). This may be a request for a first engine start of the engine since vehicle assembly, also known as a green engine start. Between t0 and t1, the engine has not yet been started, no fuel has been delivered to the engine (plot 502), and the engine is at rest (plot 504). Herein, the engine is in a green condition, as the vehicle is still in a pre-delivery state at the assembly plant. At this time, before the engine is started, the engine may be opportunistically operated with a first spark plug cleaning calibration, as described with reference to FIG. 3. This cleaning calibration may include cleaning the spark plug via intermittent ignition coil discharge in response to an engine restart request, before the engine is fueled and started. Thus, between t0 and t1, the ignition coil may be discharged (plot 514) prior to engine start to raise the spark plug tip temperature (plot 512) and remove any accumulated soot. This calibration may be performed as a preventative measure to pre-empt spark plug fouling issues.

At t1, responsive to a key-on event of the assembled vehicle, fuel is delivered to the engine (plot 502) to start the engine, and the spark plug ignition coil is discharged (plot 514) to ignite fuel. Herein, the spark plug coil is discharged synchronous to engine speed. Engine speed (plot 504) may increase as the engine is spun via fuel combustion, responsive to the driver demand. Between t1 and t2, as the engine is operated, a spark plug soot load may start to increase (plot 508). In the example illustrated in graph 500, the spark plug soot load remains below a threshold amount (dashed line 510), above which spark plug fouling is indicated. Therefore, the spark plug fouling diagnostic flag (plot 516) remains off. Also between t1 and t2, the spark plug tip temperature (plot 512) increases as the engine is operated. However, due to the low speed-load engine operation, the spark plug tip temperature does not reach high enough temperatures to burn off the accumulated soot. As a result, soot starts to accumulate on the spark plug.

At t2, responsive to an engine shutdown request, engine fueling may be discontinued (plot 502) and the engine may start spinning down to rest. During the engine spin down to rest, spark plug soot may be opportunistically removed by discharging the spark plug ignition coil with a frequency and output based on the soot load of the spark plug. In particular, the spark plug may be discharged aggressively with a higher output and a higher frequency after t3, once the engine speed has fallen to threshold speed 506 during the engine spin-down. Discharging the ignition coil (plot 514) may quickly raise the spark plug tip temperature (plot 512) to a level that burns off the accumulated soot, with a corresponding drop in soot load (plot 508). As such, if the spark plug were not discharged during the engine spin-down, the spark plug tip temperature would have started to drop, as indicated by dashed segment 513. In addition, the spark plug soot load would have remained high, as indicated by dashed segment 509, which may have resulted in the spark plug getting soot fouled prematurely. For example, the soot load of the green engine spark plug may have reached the fouling threshold 510 even before the vehicle had left the assembly plant. This would have resulted in undesirable low mileage warranty issues for the vehicle.

At t4, the engine is at rest. Due to the spark plug soot load being reduced, further discharging of the spark plug is stopped. Also, between t4 and t5, while the engine is at rest and before the next engine start, the spark plug coil is intermittently discharged so as to opportunistically burn off any accumulated soot.

Between t5 and t6, the engine is started and stopped multiple times as the vehicle is moved between stations of the assembly plant. On each engine restart, while the engine is at rest and before engine fueling is resumed, the spark plug coil is discharged with a higher output and a higher frequency. Also on each engine spin down to rest between t5 and t6, the spark plug coil is discharged with the higher output and the higher frequency to opportunistically burn off soot accumulated on the spark plug from the frequent short trips. By intermittently discharging the spark plug in accordance with a first, more aggressive spark schedule while the engine is in the pre-delivery state (between t0 and t6), the spark plug tip temperature can be held elevated and spark plug health can be improved.

Between t6 and t7, the vehicle leaves the assembly plant and the green engine spark discharge calibration is disabled. Shortly before t7, the engine is at rest in the post-delivery state. At t7, a vehicle door is opened by an operator, signaling an imminent engine restart event. Responsive to the upcoming restart event, at t7, a second, less aggressive spark discharge schedule is initiated with the spark plug being discharged intermittently to raise spark plug tip temperature and burn off any soot existing on the spark plug. In particular, the discharge schedule applied between t7 and t8 includes discharging the ignition coil intermittently, before fuel is delivered to restart the engine, the discharging performed with a lower output and a lower frequency than the first discharge schedule applied for the green engine (at t0-t1). At t8, engine fueling is resumed to restart the engine and the intermittent discharging of the ignition coil to burn off soot is disabled. Between t8 and t9, the ignition coil is discharged synchronous to engine speed to enable cylinder fuel combustion. Between t8 and t9, as engine speed-load changes, soot starts to accumulate on the spark plug.

At t9, spark plug soot load exceeds threshold 510, resulting in spark plug fouling being indicted via the setting of a flag (plot 516). Responsive to the indication of spark plug fouling, between t9 and t10, while the engine is spinning fueled and combusting fuel, one or more of spark timing and cam timing adjustments may be used to raise spark plug tip temperature and reduce spark plug soot load. For example, spark timing may be advanced and cam timing may be adjusted to delay exhaust valve opening between t9 and t10, with a concurrent rise in spark plug tip temperature and a drop in spark plug soot load.

At t10, an engine shutdown command is received. Accordingly, engine fueling is disabled at t10. While the engine spins down to rest, the spark plug is opportunistically discharged according to the second spark schedule to further address the spark plug fouling. As at t7, during the spin down, the spark plug is discharged intermittently with a lower output and a lower frequency than the first discharge schedule applied on the green engine spin down (at t3-t4). The second discharge schedule is maintained after the engine comes to rest and before the subsequent engine restart at t11. As a result, spark plug tip temperature can be maintained elevated, spark plug soot load may be lowered quickly, and the spark plug fouling flag can be cleared shortly after t10.

In this way, by discharging a spark plug ignition coil while an engine is not fueled, such as during engine spin-down to rest and before an engine restart, spark plug tip temperatures can be raised sufficiently to burn off accumulated soot deposits. By adjusting an output and frequency of the discharging to be higher in a green engine, spark plug fouling due to frequent, short drive cycles at an assembly plant can be pre-empted. By applying a more aggressive spark plug cleaning calibration in the pre-delivery state of the vehicle, low mileage warranty issues can be reduced. By adjusting the output and frequency of the discharging to be lower in a non-green engine, spark plug tip temperatures can be maintained elevated over a wider range of engine speed-load conditions. By applying a less aggressive discharge approach in the post-delivery state of the vehicle, spark discharge adjustments can be coordinated with more aggressive spark and cam timing adjustments to burn off accumulated soot in response to an indication of spark plug fouling. By addressing spark plug fouling in an expedited and efficient manner, engine component life is extended and engine performance is improved.

One example method for an engine coupled in a vehicle comprises: responsive to an engine shutdown request, after disabling cylinder fueling, intermittently discharging an ignition coil of a spark plug, discharge parameters of the discharging based on a soot load of the spark plug. In the preceding example, additionally or optionally, discharging responsive to the engine shutdown includes discharging while the engine spins down to rest and while the engine is at rest, and wherein the soot load is an inferred or measured soot load. In any or all of the preceding examples, additionally or optionally, the discharge parameters include one or more of a frequency of discharging the ignition coil, a duty cycle of the discharging, and a discharge current, each of the frequency, the duty cycle, and the discharge current increased as the soot load of the spark plug increases. In any or all of the preceding examples, additionally or optionally, the method further comprises intermittently discharging until an inferred spark plug tip temperature is higher than a threshold, and then discontinuing the discharging, the threshold based on the soot load of the spark plug. In any or all of the preceding examples, additionally or optionally, the method further comprises in response to an engine restart request following the engine shutdown request, intermittently discharging the ignition coil of the spark plug before resuming engine fueling on a first combustion event since the engine restart request. In any or all of the preceding examples, additionally or optionally, the method further comprises, after the first combustion event has elapsed, operating the engine with one or more of spark timing advanced from a nominal spark timing and variable cam timing retarded from a nominal cam timing, a degree of spark timing advance and cam timing retard selected based on the spark plug soot load. In any or all of the preceding examples, additionally or optionally, the engine is coupled in a vehicle, and wherein the intermittently discharging includes discharging according to a first discharge schedule having a higher discharge frequency and a larger discharge duty cycle until an integrated value based on a number of engine start events since assembly of the vehicle and a duration of each of the number of engine start events is higher than a threshold value. In any or all of the preceding examples, additionally or optionally, the intermittently discharging further includes, after the integrated value is higher than the threshold value, discharging according to a second discharge schedule having a lower discharge frequency and a smaller discharge duty cycle. In any or all of the preceding examples, additionally or optionally, the threshold value is adjusted based on one or more of an alcohol content of fuel injected into the engine, a seasonal grade of the fuel, and a split ratio of fuel injected via port fuel injection relative to direct injection, the seasonal grade of the fuel including one of a winter blend and a summer blend.

Another example method for a vehicle engine comprises: while a vehicle is in a pre-delivery state at an assembly plant, operating the engine according to a first spark schedule responsive to inferred soot load being higher than a first threshold; and while the vehicle is in a post-delivery state outside the assembly plant, operating the engine according to a second, different spark schedule responsive to inferred soot load being higher than a second threshold, the first threshold higher than the second threshold. In the preceding example, additionally or optionally, the first spark schedule includes discharging an ignition coil of the spark plug with a higher frequency and a longer duty cycle when spinning the engine to rest, unfueled, and before restarting the engine, and the second spark schedule includes discharging the ignition coil of the spark plug with a lower frequency and a shorter duty cycle when spinning the engine to rest, unfueled, and before restarting the engine. In any or all of the preceding examples, additionally or optionally, the first spark schedule further includes operating with more spark timing retard when the engine is combusting and the second spark schedule further includes operating with less spark timing retard when the engine is combusting. In any or all of the preceding examples, additionally or optionally, the method further comprises, while the vehicle is in the pre-delivery state at the assembly plant, transitioning from the first spark schedule to the second spark schedule responsive to an integrated value determined as a function of a number of engine start events since assembly of the vehicle and a duration of each of the number of engine start events is higher than a threshold value. In any or all of the preceding examples, additionally or optionally, the method further comprises, while the vehicle is in the pre-delivery state, maintaining operation of the engine with the first spark schedule until an inferred spark plug temperature is higher than a threshold temperature, and then transitioning to the second spark plug schedule. In any or all of the preceding examples, additionally or optionally, each of the first and second threshold are based on each of an alcohol content of fuel injected into the engine, a seasonal grade of the fuel, and a split ratio of fuel port injected into the engine relative to direct injected into the engine during an engine start.

Another example system for a vehicle comprises: an engine including a cylinder; a direct injector; a spark plug including an ignition coil for delivering spark to the cylinder; and a controller with computer-readable instructions stored on non-transitory memory for: for a first engine shutdown and a number of engine shutdowns thereafter of the vehicle following vehicle assembly, operating the engine with spark discharged repetitively as the engine spins down to rest, unfueled, a frequency and a duty cycle of spark discharge based on an estimated soot load of the spark plug. In the preceding example, additionally or optionally, the controller includes further instructions for: increasing the frequency and duty cycle of the spark discharge as the estimated soot load increases. In any or all of the preceding examples, additionally or optionally, the operating with spark discharged repetitively includes operating before an indication of spark plug fouling is received. In any or all of the preceding examples, additionally or optionally, the controller includes further instructions for: after the number of engine shutdowns have elapsed, selectively operating the engine with spark discharged repetitively as the engine spins down to rest responsive to the indication of spark plug fouling. In any or all of the preceding examples, additionally or optionally, the system further comprises intake and/or exhaust cams coupled to a valve of the cylinder, and the controller includes further instructions for: after the number of engine shutdowns have elapsed, responsive to the indication of spark plug fouling, operating the engine with spark timing retarded from a nominal timing and cam timing adjusted to delay exhaust valve opening.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   operating an engine of a vehicle while the vehicle is in a pre-delivery state at an assembly plant, including discharging a spark plug ignition coil according to a first spark schedule responsive to an indication of spark plug fouling while the engine is fueled;
   while the vehicle is in the pre-delivery state, intermittently discharging the spark plug ignition coil according to a second spark schedule, different than the first spark schedule, while the engine is unfueled responsive to a request for an engine start and also responsive to a request for an engine shutdown, regardless of the indication of spark plug fouling;
   operating the engine while the vehicle is in a post-delivery state outside the assembly plant, including discharging the spark plug ignition coil according to a third spark schedule, different than each of the first spark schedule and the second spark schedule, responsive to the indication of spark plug fouling while the engine is fueled; and
   while the vehicle is in the post-delivery state, intermittently discharging the spark plug ignition coil while the engine is unfueled according to a fourth spark schedule, different than each of the first spark schedule, the second spark schedule, and the third spark schedule, responsive to the indication of spark plug fouling while the engine start is requested and also responsive to the indication of spark plug fouling while the engine shutdown is requested, each of the second spark schedule and the fourth spark schedule including a smaller amount of spark advance during the engine start than during the engine shutdown.

2. The method of claim 1, wherein the second spark schedule includes intermittently discharging the spark plug ignition coil with a higher frequency and a longer duty cycle when spinning the engine to rest, unfueled, and before starting the engine, and wherein the fourth spark schedule includes intermittently discharging the spark plug ignition coil with a lower frequency and a shorter duty cycle when spinning the engine to rest, unfueled, and before starting the engine.

3. The method of claim 1, wherein discharging the spark plug ignition coil according to the first spark schedule responsive to the indication of spark plug fouling while the engine is fueled further includes operating the engine with the first spark schedule and late exhaust valve opening while the engine is combusting and responsive to a soot load of the spark plug being greater than a first threshold, wherein discharging the spark plug ignition coil according to the third spark schedule responsive to the indication of spark plug fouling while the engine is fueled includes operating the engine with the third spark schedule while the engine is combusting and responsive to the soot load of the spark plug being greater than a second threshold, less than the first threshold, and wherein the first spark schedule includes operating with more spark timing advance than the third spark schedule when the engine is combusting.

4. The method of claim 1, further comprising, while the vehicle is in the pre-delivery state at the assembly plant, transitioning from the first spark schedule to the third spark schedule and from the second spark schedule to the fourth spark schedule responsive to an integrated value being higher than a threshold value, the integrated value determined as a function of a number of engine start events since assembly of the vehicle and an engine on duration since the assembly of the vehicle.

5. The method of claim 1, further comprising, while the vehicle is in the pre-delivery state, maintaining operation of the engine with the first spark schedule until an inferred spark plug temperature is higher than a threshold temperature, and then transitioning to the third spark schedule.

6. The method of claim 1, wherein the indication of spark plug fouling includes a soot load of the spark plug ignition coil being greater than a threshold, and the threshold is based on each of an alcohol content of fuel injected into the engine, a seasonal grade of the fuel, and a split ratio of fuel port injected into the engine relative to direct injection into the engine during the engine start.

\* \* \* \* \*